Aug. 7, 1951  H. SCHAEVITZ  2,563,425
TORQUE RESPONSIVE APPARATUS
Filed Aug. 11, 1945  3 Sheets-Sheet 1
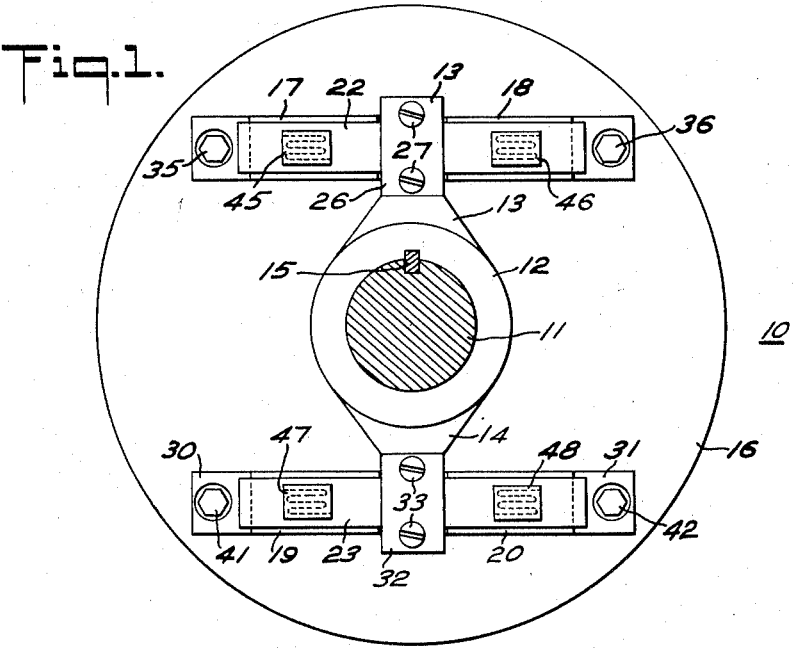
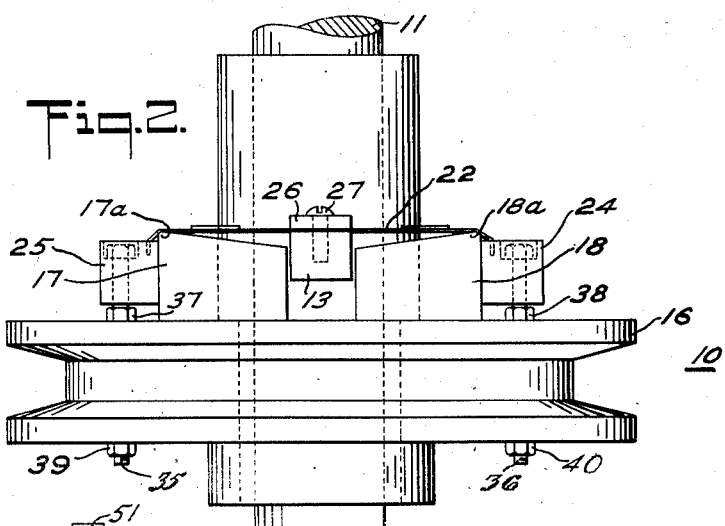
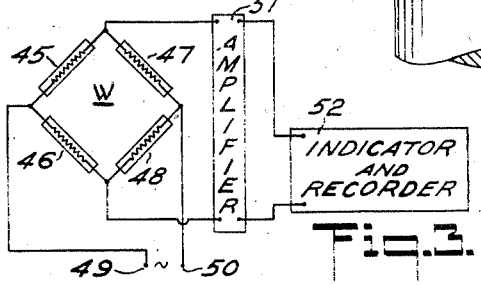
INVENTOR.
HERMAN SCHAEVITZ
BY
Edward U Hathaway
ATTORNEY

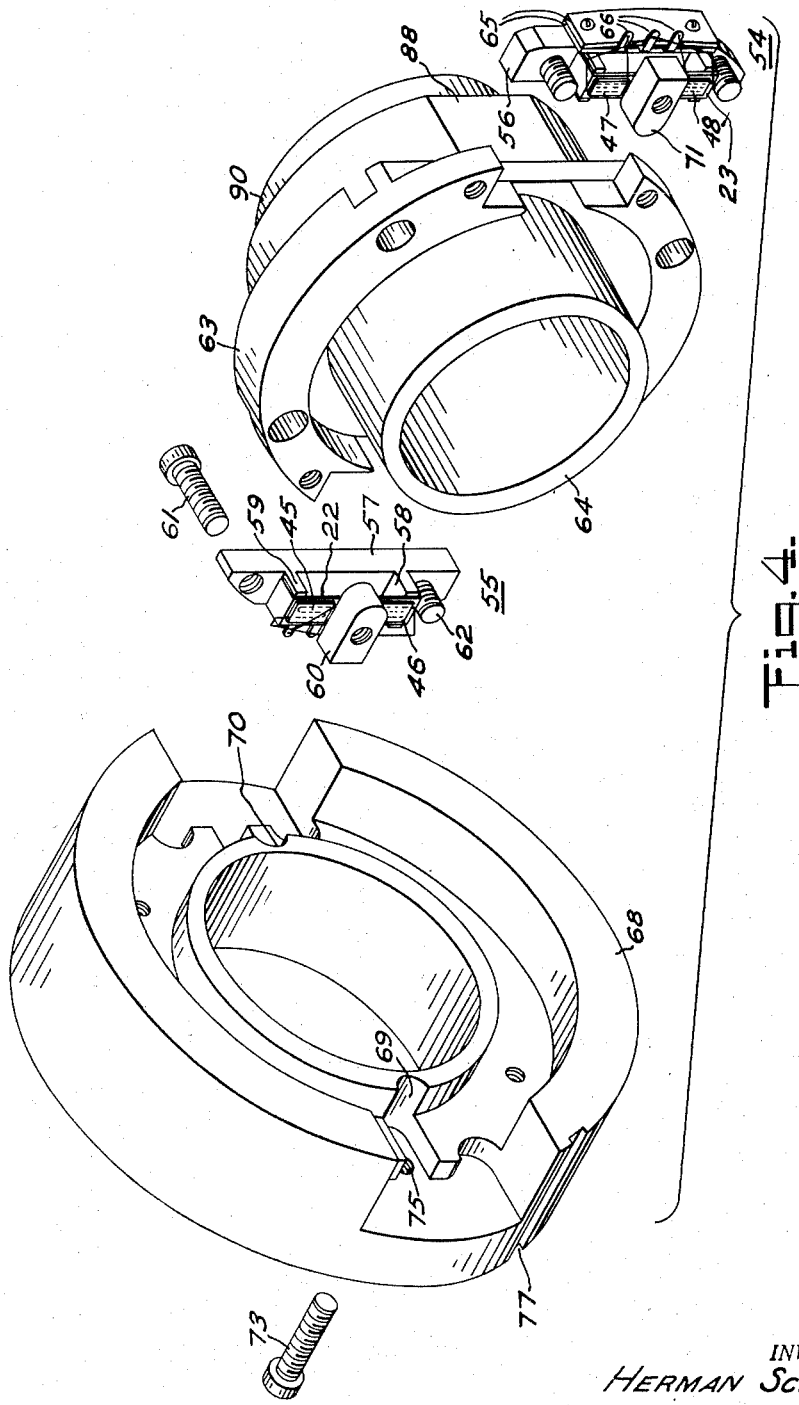

INVENTOR.
HERMAN SCHAEVITZ
BY
ATTORNEY

Patented Aug. 7, 1951

2,563,425

UNITED STATES PATENT OFFICE 2,563,425

TORQUE RESPONSIVE APPARATUS

Herman Schaevitz, Collingswood, N. J., assignor to Baldwin-Lima-Hamilton Corporation, a corporation of Pennsylvania Application August 11, 1945, Serial No. 610,309

6 Claims. (Cl. 73—136)

This invention relates to electrical dynamometers of the type used for measuring forces, particularly torsional forces, whether they be of a constant or of transient magnitude and has for an object the provision of a simple and entirely reliable dynamometer system.

Theretofore, the measurement of torque has represented a problem for which many solutions have been offered. Prior to the present invention there existed a need for a system by means of which the force applied to a rotating shaft could be directly and accurately measured, particularly where the forces are of relatively small magnitude.

In carrying out the present invention the force or torque is applied to a shaft through the medium of tension members which, because of their elasticity, dimensionally change by amounts related to the torque or to the magnitude of the applied force. Impedance changes are produced in electrical strain gages connected to the tension members. These are related to the strains produced in the tension members. The impedance changes are translated into indications of the instantaneous magnitude of the applied force. In the preferred form of my invention the electrical strain gages are shown as of the bonded wire resistance type although other forms might be used.

For a more complete understanding of the invention and for further objects and advantages thereof reference is to be had to the following description taken in connection with the accompanying drawings in which:

Fig. 1 is an end view of a dynamometer embodying the invention;

Fig. 2 is a plan view of Fig. 1;

Fig. 3 illustrates diagrammatically a simplified wiring diagram which may be used in connection with the several modifications of the invention;

Fig. 4 is an exploded perspective view of the essential parts of a modified form of the invention;

Figure 5:
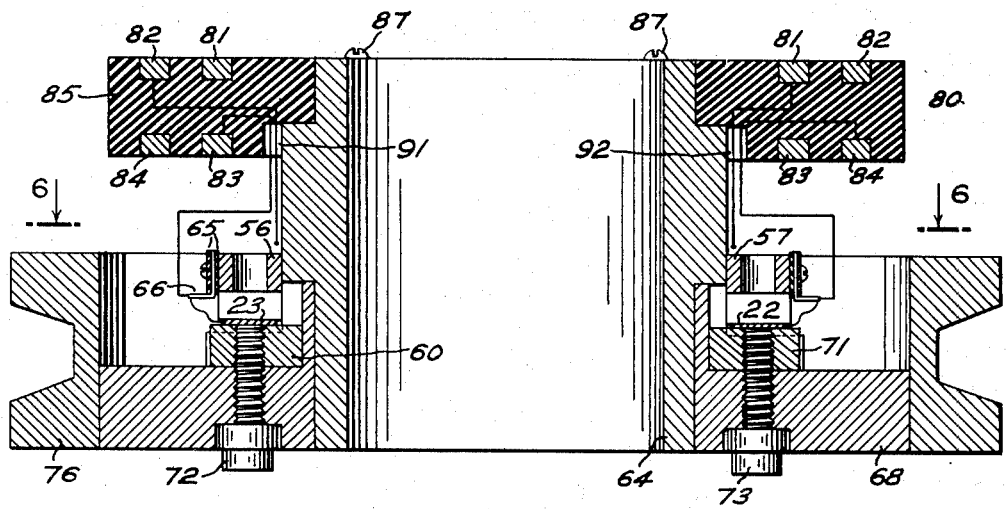
Fig. 5 is a sectional view of the parts of Fig. 4 in their assembled positions.

Referring to the drawings, a dynamometer 10 has been illustrated in Figs. 1 and 2 as applied to a shaft 11. The dynamometer itself comprises a hub member 12 having arms 13 and 14 extending outwardly therefrom along a diametral line thereof. The hub 12 is secured to the shaft 11 by any suitable means such, for example, as by a key 15. The shaft 11 may be either the driving shaft or the driven shaft. There is loosely mounted on the shaft 11 a pulley 16. Though supported by the shaft, it is not driven by it. The pulley 16 is provided with bosses or projections 17 and 18, the inner ends of which are spaced one from the other to receive therebetween the rectangular end of the arm 13. Similar bosses or projections 19 and 20 formed integrally with the pulley 16 are provided to receive between the inner ends thereof the rectangular end of the arm 14. The respective bosses 17—20 have angular outer faces which, as shown in Fig. 2, slope toward the face of the pulley 16 to provide clearance for tension members 22 and 23. The member 22 has one end secured in a recess in a lug 24 extending from the boss 18, as by soldering. The opposite end of the member 22 is similarly secured in a recess in a lug 25 extending from the other boss 17. Each of tension members 22 and 23 is initially secured in place with a predetermined pre-stress or tension produced therein. Thus, as shown in Fig. 2, the tension member 22 is tightly stretched across the outer shoulders 17a and 18a of the bosses 17 and 18. The extension or arm 13 from the hub 12 is secured to the mid portion of the tension member 22 by means of a clamping member 26 held in place by screws 27 or solder, or both. Similarly, the tension member 23 is soldered to lugs 30 and 31 extending from the bosses 19 and 20 and a clamping member 32 by means of screws 33, or solder, or both, connects the extension or arm 14 to the mid portion thereof. The lugs 24 and 25 have bolts 35 and 36 extending therethrough and through the body of the pulley 16. By loosening lock nuts 37 and 38 and by tightening the nuts 39 and 40 additional tension may be produced in the tension member 22. The bolts 41 and 42 extending through the lugs 30 and 31 may be similarly utilized to control the amount of tension in the strip 23. In general, it is preferred to complete the assembly of the tension members 22 and 23 at the factory with a predetermined tension existing therein, thus avoiding the need in the field to rely upon the bolts 35—36 and 41—42 to change their calibrated values.

Torque applied either to the shaft 11 or to the pulley 16 will be transmitted through the tension members 22 and 23. These members are preferably formed of a material which is relatively elastic. They may be of beryllium, copper, Phosphor bronze, or a soft or relatively hard steel, depending upon the magnitude of the forces to be measured.

Referring particularly to Fig. 1, it will be assumed that torque is applied to the shaft 11 to rotate it in a clockwise direction and that the pulley 16 is restrained by the absorption of power through any well understood means, such as a brake or electrical generator or in driving or moving a load or in transmitting a force to a machine or some part thereof. The arm or projection 13 will increase the stress or tension in the left hand part of the tension member 22 while it will decrease the stress or tension in the right hand section of member 22. At the same time, the arm or extension 14 will increase the stress or tension in the right hand section of the member 23 while decreasing the stress or tension in the left hand section thereof. To secure maximum response from the redistribution of the stresses, strain gages 45—48 are bonded to the respective right and left hand sections of the members 22 and 23. As shown in Fig. 3, the gages 45 and 48 form two arms of a Wheatstone bridge W while the gages 46 and 47 form the remaining arms of the bridge. Power is supplied to the bridge from any suitable source as indicated by the supply terminals 49 and 50. Though direct current may be utilized, it is preferred that the power be supplied from an alternating current source such as an oscillator. The output terminals of the bridge W are connected to an amplifier 51, the output of which is applied to an indicator and/or a recorder 52.

The strain gages 45—48 are preferably of the type disclosed in Simmons' Patent 2,292,549. Each gage consists of a relatively fine wire or filament bonded to the members 22 and 23. Each gage has the characteristic of changing its electrical resistance in accordance with the strain or surface movement of the members 22 and 23. Accordingly, the Wheatstone bridge W will preferably be in a balanced condition in the absence of the application of torque between the shaft 11 and the pulley 16. Upon application of torque, the bridge W will be unbalanced by an amount related to the magnitude of the applied torque. The output from the bridge W, either before or after amplification, may be utilized to actuate an indicator or the indicator may be combined with a recorder, or the recorder alone may be utilized to yield a record of the magnitude of the applied torque.

In practice, the dynamometer 10 has proved entirely satisfactory in the measurement of force or of torque applied between the shaft 11 and the pulley 16. Its sensitivity is high and it has been found reliable in operation. Nevertheless, if sudden overloads are applied to the dynamometer it is possible that one or both of tension members 22 and 23 might fail. If that should occur, a driving connection is maintained between the driving and driven members. Normally, the arms or extensions 13 and 14 are positioned midway of the inner ends of the bosses 17—20. Accordingly, upon failure or breakage of one or both of members 22 and 23, the extensions or arms 13 and 14 move into engagement with the bosses to complete a driving connection between the hub 12 and the pulley 16.

The modification illustrated in Figs. 4-7 combines several novel features though the operation is fundamentally the same as that of Figs. 1 and 2. Thus, the tension members 22 and 23 respectively carrying strain gages 45—46 and 47—48 form a part of sub-assemblies 54 and 55 respectively mounted on frame members 56 and 57. Since these are identical in construction, only the sub-assembly 55 will be described in detail. It comprises the frame or base member 57 having outwardly extending ledges 58 and 59 to which the tension or stress member 22 is secured, as by soldering or brazing. To the center of the stress member 22 there is attached, as by soldering or brazing, a driving lug 60. The assembly as a whole is bolted as by the bolts 61 and 62 to a flange 63 of the hub 64. To simplify the wiring, each sub-assembly also carries a terminal block. As shown, the terminal block for the assembly 54 consists of members 65 of insulating material which carry three terminals 66. The strain gages 45 and 46 are connected to these terminal strips as indicated.

With both of the sub-assemblies 54 and 55 secured to the hub 64, the dynamometer is completed by carefully nesting the hub within a frame 68 of the driving pulley. It will be observed that this frame is provided with recesses 69 and 70 of shape complementary to the driving lugs 60 and 71 of the assemblies 54 and 55. Though these lugs may closely fit within the recesses 69 and 70 and thus not require separate fastening means, it is preferred to secure them in position by means of threaded screws 72 and 73, Figs. 4 and 5, extending through openings respectively located midway of the recesses 69 and 70. For example, the screw 73 may be moved through the opening 75 threadedly to engage the threaded opening in the driving lug 71. After the hub 64 and frame 68 have been assembled together, a separate rim member 76 is moved into place, as shown in Fig. 5. A key inserted in a keyway 77 is provided in the frame member 68 to insure a good driving connection between it and the rim 76.

Figure 6:
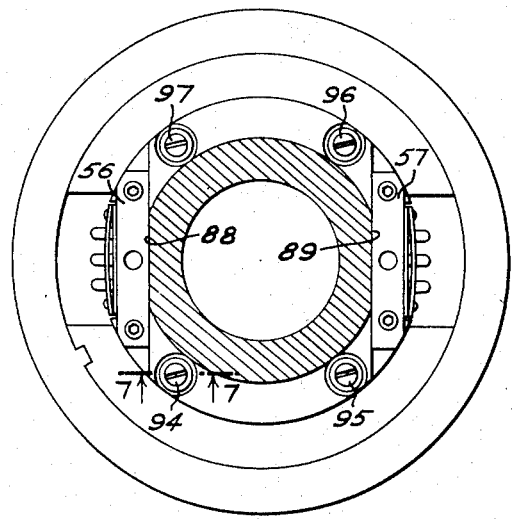
Fig. 6 is a view, partly in section, taken on the line 6—6 of Fig. 5.

There is then secured to one end of the hub 64 a sub-assembly 80 comprising four slip rings 81—84 respectively embedded in an insulating member 85. This member is secured to the hub 64 as by fastening screws 87. As best shown in Figs. 4 and 6, the hub 64 has flattened sections 88 and 89 which extend from the flange 63 outwardly to the end portion 90 of reduced diameter. These flattened portions 88 and 89 not only make room for the frame members 56 and 57 but they also provide clearance with the insulating member 85. In consequence, as best shown in Fig. 5, lead wires may extend from the respective slip rings 83 and 82 downwardly through the space 91 while lead wires from the slip rings 81 and 84 may extend downwardly through the space 92. The strain gages are preferably connected as shown in the measuring system of Fig. 3. Accordingly, stationary brushes, not shown, cooperate with the slip rings 83 and 84 to supply power to the network including the strain gages 45—48 while the output from the network is derived from brushes, not shown, which engage the slip rings 81 and 82.

Figure 7:
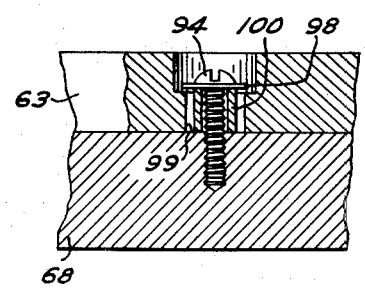
Fig. 7 is a fractional sectional view taken on the line 7—7 of Fig. 6.

During operation, if one of the tension members 22 or 23 should break, driving engagement will be transferred from them to four screws 94—97 respectively encircled by collars, one of which, the collar 100, is shown in Fig. 7. It will be observed that the flange 63 of the hub 64 is provided with countersunk openings through which extend the screws 94—97. Each opening is of substantially greater diameter than the collar 100. Thus, as shown in Fig. 7, it will be seen that the opening 99 provides clearance between its wall and the outer surface of the collar 100. The height of the collar 100 is sufficiently great to hold a washer 98 above the shoulder of the countersunk opening 99. Accordingly, upon breakage of one of the members 22 or 23 the driving connection will be transferred to the collars 100 which are thereupon moved against the sides of the respective openings in which they are disposed.

While preferred modifications of the invention have been described, it will be understood other modifications may be made without departing from the spirit and scope of the invention as set forth in the appended claims.

What is claimed is:

1. A dynamometer comprising a member movable about an axis and having at least two arms extending diametrically thereof, a second member associated therewith, a pair of prestressed elements extending on opposite sides of said arms and carried by said second member adjacent the ends of said arms, means securing the respective ends of said arms to said prestressed elements for transmission of forces from one to the other of said members, and a pair of wire type strain gages whose wire is bonded throughout its effective length to the surface of each of said prestressed elements on opposite sides of said arms so as to be directly responsive to strain of the material of which said elements are formed.

2. A torque pulley comprising a hub member, a separate body member, means including a pair of prestressed elements secured to and disposed on opposite sides of the center of one of said members, means connected to the other of said members and secured to the respective mid portions of each of said prestressed elements and forming therewith a driving connection between said members, and wire type strain gages whose wire is bonded throughout its effective length to the surface of each prestressed element on opposite sides of said mid portions thereof so as to be directly responsive to strain of the material of which said elements are formed.

3. A torque pulley comprising a body member and a hub having an outwardly extending flange with recesses provided in diametrically opposite sides thereof, means including prestressed elements supported from said hub and extending across each of said recesses, a lug connected to the mid portion of each prestressed element to form a unit therewith, said body member having means disposed in driving engagement with said lugs, and strain gages bonded to each of said prestressed elements.

4. A sub-assembly for a torsion dynamometer comprising a frame member having projections spaced one from the other and each of the same being disposed on the same side of the torsional axis and radially spaced relative thereto to provide a predetermined moment arm, an elastic element having a lengthwise surface extending in a straight line between said projections so as to be tangent to a circle concentric to the torsional axis and of a radius equal to said moment arm, means for firmly securing said elements to said projections and subjecting the elements to a predetermined initial stress which causes said element to be taut, means for applying a force intermediate the ends of said element and lengthwise thereof, and a strain gage bonded to said element on either side of said force applying means.

5. A replaceable sub-assembly for a torsion dynamometer comprising a frame member having a pair of projections spaced one from the other and each of the same being disposed on the same side of the torsional axis and radially spaced relative thereto to provide a predetermined moment arm, an elastic element having a lengthwise surface extending in a straight line between said projections so as to be tangent to a circle concentric to the torsional axis and of a radius equal to said moment arm, means for firmly securing said elements to said projections and subjecting the elements to a predetermined stress, a terminal block carried by said frame member, force applying means carried by said element intermediate the ends thereof, strain gages bonded to said element on opposite sides of said force applying means, and lead wires connecting said strain gages to said terminal block.

6. A torsion dynamometer comprising a driving member and a driven member respectively having axes about which they move angularly, a pair of tension load transmitting elastic elements each extending along straight lines respectively disposed on diametrically opposite sides of the axis of one of said members and being carried thereby, means associated with the other of said members for completing a driving connection to the respective elements intermediate the ends thereof, means whereby said elements are adapted to be initially prestressed, means operable upon failure of one of said elements for completing a rigid driving connection between said members, and means for determining the load transmitted through said elastic elements.

HERMAN SCHAEVITZ.

REFERENCES CITED

The following references are of record in the file of this patent:

UNITED STATES PATENTS

| Number | Name | Date |
| --- | --- | --- |
| 195,837 | Nagle | Oct. 2, 1877 |
| 2,007,505 | Smith | July 9, 1935 |
| 2,053,560 | Janovsky | Sept. 8, 1936 |
| 2,252,464 | Kearns et al. | Aug. 12, 1941 |
| 2,260,036 | Kuehni | Oct. 21, 1941 |
| 2,350,072 | Simmons | May 30, 1944 |
| 2,377,212 | Cottrell | May 29, 1945 |
| 2,403,952 | Ruge | July 16, 1946 |

FOREIGN PATENTS

| Number | Country | Date |
| --- | --- | --- |
| 25,382 | France | Oct. 24, 1922 |